United States Patent [19]
Garand

[11] Patent Number: 5,953,807
[45] Date of Patent: Sep. 21, 1999

[54] METHOD FOR INSTALLING AND ALIGNING PUNCHES IN AN IMAGING SYSTEM

[75] Inventor: Donald J. Garand, Chelmsford, Mass.

[73] Assignee: Agfa Corporation, Wilmington, Mass.

[21] Appl. No.: 09/000,916

[22] Filed: Dec. 30, 1997

[51] Int. Cl.⁶ .................................................. B23Q 3/00
[52] U.S. Cl. .............................. 29/464; 83/54; 347/262; 347/264; 347/139
[58] Field of Search .............................. 29/464; 347/262, 347/264, 139; 83/54

[56] References Cited

U.S. PATENT DOCUMENTS 4,566,573  1/1986  Lane, Jr. ................................ 192/70
5,709,139  1/1998  Shimizu et al. ........................... 83/54

*Primary Examiner*—P. W. Echols
*Assistant Examiner*—John Hong
*Attorney, Agent, or Firm*—John A. Merecki

[57] ABSTRACT

A punch assembly including at least one punch installed and aligned on a carrier plate. The carrier plate includes a plurality of openings which are configured to mate with corresponding precision locator pins on an imaging system. The punch assembly is installed on the imaging system by inserting the precision locator pins through the plurality of openings in the carrier plate.

17 Claims, 2 Drawing Sheets

METHOD FOR INSTALLING AND ALIGNING PUNCHES IN AN IMAGING SYSTEM

FIELD OF THE INVENTION

The present invention is in the field of imaging systems. More specifically, the present invention provides a method and apparatus for installing and aligning standard or custom ordered punches onto the internal drum of an imagesetter, platesetter, or other imaging system, at any field or customer location.

BACKGROUND OF THE INVENTION

Currently, both standard and custom punches must be installed on an imagesetter or platesetter at a factory site using complex alignment fixtures and tooling. This increases the cost of the system, often causes delays in filling orders, and commonly requires the modification of completed and boxed systems.

SUMMARY OF THE INVENTION

The present invention provides a method and apparatus for installing punches onto an imaging system. The punches are accurately installed and aligned on a carrier plate at a manufacturing location, forming a punch assembly. The carrier plate includes a plurality of openings which are configured to mate with corresponding precision locator pins on the imaging system. The punch assembly is installed on the imaging system by inserting the precision locator pins through the plurality of openings in the carrier plate.

Generally, the present invention provide a method for installing punches on an internal drum of an imaging system, comprising the steps of:

positioning a plurality of locator pins on the internal drum;

providing a carrier plate having a plurality of openings configured to receive the plurality of locator pins therein;

aligning and installing at least one punch on the carrier plate, thereby forming a. punch assembly;

installing the punch assembly onto the internal drum by inserting the plurality of locator pins on the internal drum through the plurality of openings on the carrier plate; and securing the punch assembly to the internal drum.

BRIEF DESCRIPTION OF THE DRAWINGS

The features of the present invention will best be understood from a detailed description of the invention and a preferred embodiment thereof selected for the purposes of illustration and shown in the accompanying drawings in which.

DETAILED DESCRIPTION OF THE INVENTION

Figure 1:
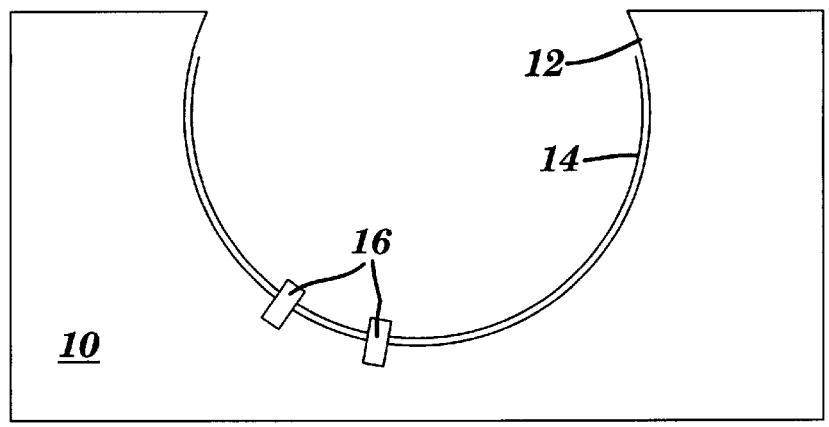
FIG. 1 is an end view of an internal drum having a plurality of side punches mounted thereon in accordance with the prior art.

The features and advantages of the present invention are illustrated in detail in the accompanying drawings, wherein like reference numerals refer to like elements throughout the drawings.

An end view of a prior art type internal drum 10, used in applications such as an imagesetter or platesetter, is illustrated in FIG. 1. The internal drum 10 includes a cylindrical imaging surface 12 for supporting a supply of recording media 14 during imaging. Imaging systems incorporating an internal drum are disclosed, for example, in U.S. Pat. Nos. 5,598,739, 5,655,452, and 5,671,005, which are hereby incorporated by reference.

As known in the art, many imaging systems are equipped with internal punches which are configured to punch a predetermined set of holes into the recording media being imaged. In FIG. 1, for example, a plurality of side punches 16 are shown mounted to an end of the internal drum 10. Advantageously, by registering the recorded image to the set of holes in the recording media, accurate registration throughout the prepress process can be achieved. Unfortunately, as noted above, the installation and alignment of head, tail, and/or side punches on an internal drum, as practiced in the prior art, generally requires the use of complex and expensive alignment fixtures which are only available at a factory location.

The present invention obviates these and other disadvantages associated with the prior art, by providing a unique method and apparatus for accurately installing and aligning standard and custom ordered punches onto the internal drum of an imaging system at any field or customer location.

Figure 2:
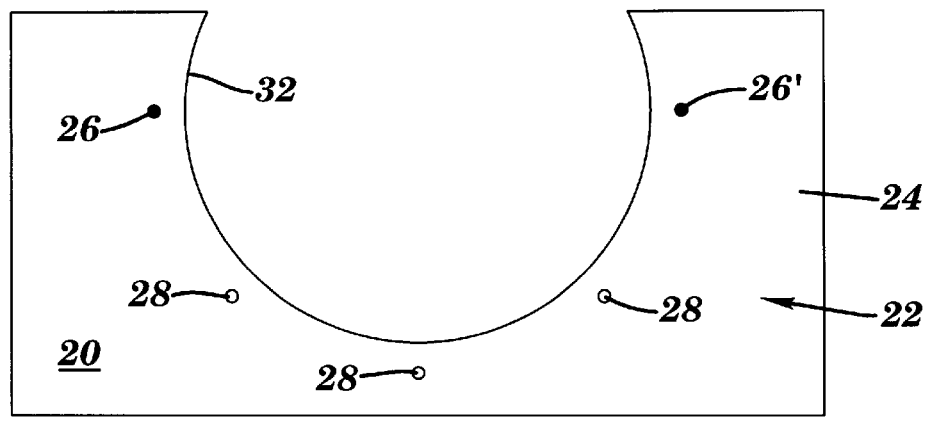
FIG. 2 is an end view of an internal drum configured in accordance with a preferred embodiment of the present invention.
Figure 3:
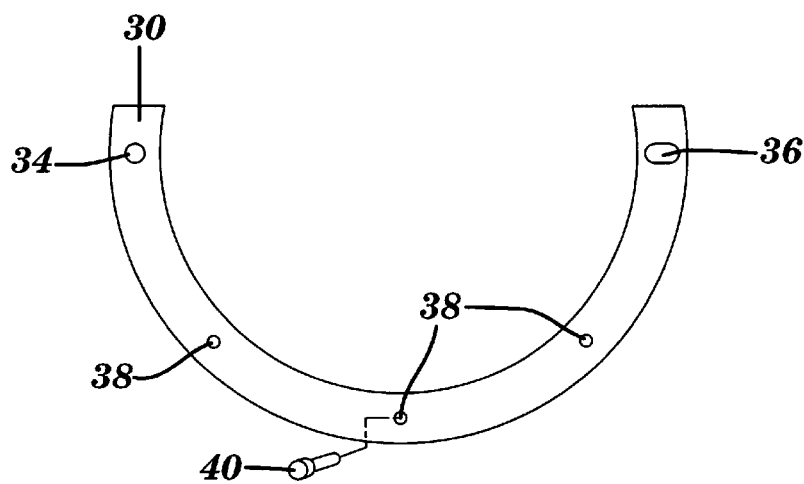
FIG. 3 illustrates a side punch carrier plate according to the present invention.

Referring now to FIG. 2, there is illustrated an end view of an internal drum 20 configured in accordance with a preferred embodiment of the present invention. Although the present invention is described hereinbelow with regard to the installation and alignment of side punches, it should be noted that the techniques of the present invention are also applicable to the installation and alignment of head, tail, and other types of internal punches commonly used in conjunction with an internal drum imaging system.

The end 22 of the internal drum 20 onto which the side punches are to be installed is provided (e.g., machined) with a precision flat surface 24. At least two precision locator pins 26, 26', or other equivalent structures, are mounted onto the end 22 of the drum 20 and extend perpendicularly away (out of the page) from the flat surface 24. At least one mounting hole 28 is formed in the flat surface 24.

A carrier plate 30, on which side punches are to be mounted, is illustrated in FIC. 3. The carrier plate 30 is shaped to conform to the curvature of the cylindrical imaging surface 32 of the internal drum 20, and has a precision flat inner surface (not shown) designed to mate against the flat surface 24 of the internal drum 20 when secured thereto.

The carrier plate 30 includes an anchor hole 34 for receiving a first one of the locator pins 26, and a slot 36 for receiving the second of the locator pins 26'. The anchor hole 34 is sized to securely receive the locator pin 26. The slot 36 compensates for any positional shift of the second locator pin 26' due to dimensional changes in the carrier plate 30 (e.g., in response to variations in temperature). The carrier plate 30 is additionally provided with at least one mounting hole 38 which, when the carrier plate 30 is mounted on the locator pins 26, 26', is positioned to align with corresponding ones of the mounting holes 28. A mounting bolt 40 or the like, inserted through each pair of mounting holes 38, 28, is used to secure the carrier plate 30 against the flat surface 24 of the internal drum 20.

Figure 4:
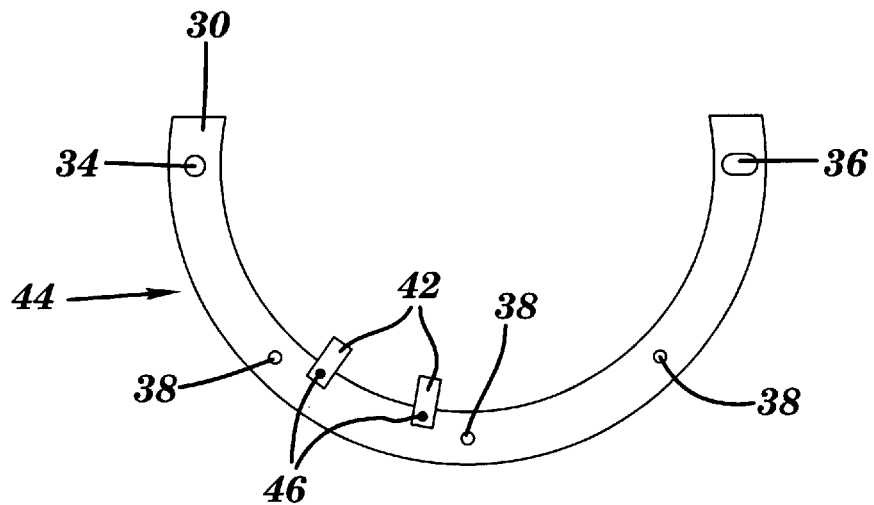
FIG. 4 illustrates a punch assembly comprising the side punch carrier plate of FIG. 3 with a plurality of side punches mounted thereon.
Figure 5:
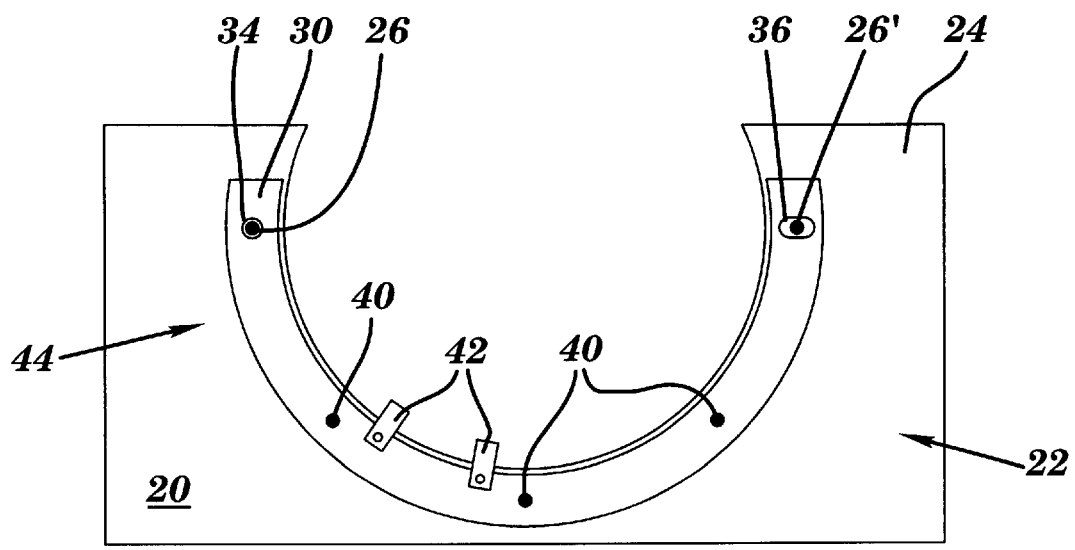
FIG. 5 illustrates the attachment of the punch assembly of FIG. 4 to the internal drum of FIG. 2.

A number of side punches 42 are installed along the inner radius of the carrier plate 30 prior to the attachment of the carrier plate 30 to the internal drum 20, thereby forming a punch assembly 44 as shown in FIG. 4. The specific locations of the side punches 42 are determined by the punch requirements of a customer. The side punches 42 are secured to the carrier plate 30 using bolts 46 or other suitable hardware. The side punches 42 are accurately installed and aligned along the internal radius of the drum 20 upon attachment of the punch assembly 44 to the end of the internal drum 20 as illustrated in FIG. 5.

In accordance with the present invention, an imagesetter, platesetter, or other type of internal drum imaging system would be built without punches and shipped to a customer site. A standard or custom punch order indicating the desired location of the punches, and any other unique punch specifications (e.g., punch type, shape, size), is transmitted by the customer to the factory. The punch order is specified according to a standard format based on the location of the precision locator pins 26, 26'. On receipt of the order, the factory fabricates or assembles the required punch configuration on a carrier plate 30 using factory fixturing and alignment tooling. The completed punch assembly 44 is shipped directly to the customer site where it is attached to the internal drum 20. Because the punch assembly 44 is attached to the internal drum 20 using the precision locator pins 26, 26', no alignment is required at the customer site.

A customer may order a plurality of punch assemblies 44, each having a different punch specification (e.g., punch location, punch type), and interchangeably install the punch assemblies onto the precision locator pins 26, 26' on the internal drum 20 while on-site. Currently, using prior art punch installation techniques, the entire imaging unit must be shipped back to the factory in order to install and align a different set of punches on the internal drum. Clearly, the present invention increases the productivity and functionality of internal drum imaging systems by simplifying the punch installation process.

The foregoing description of the present invention has been presented for purposes of illustration and description. It is not intended to be exhaustive or to limit the invention to the precise form disclosed, and many modifications and variations are possible in light of the above teaching. For example, the carrier plate may include a plurality of pins which are configured to be inserted into corresponding precision locator openings formed in the internal drum. Such modifications and variations that may be apparent to a person skilled in the art are intended to be included within the scope of this invention as defined by the accompanying claims.

I claim:

1. A method for installing punches on an internal drum of an imaging system, comprising the steps of:
    positioning a plurality of locator pins on the internal drum;
    providing a carrier plate having a plurality of openings configured to receive the plurality of locator pins therein;
    aligning and installing at least one punch on the carrier plate, thereby forming a punch assembly;
    installing the punch assembly onto the internal drum by inserting the plurality of locator pins on the internal drum through the plurality of openings on the carrier plate; and
    securing the punch assembly to the internal drum.

2. The method for installing punches according to claim 1, wherein the step of securing the punch assembly to the internal drum further includes the steps of:
    forming at least one mounting aperture on the internal drum;
    forming at least one mounting aperture on the carrier plate, wherein the at least one mounting aperture on the carrier plate is aligned with the at least one mounting aperture on the internal drum when the punch assembly is installed on the internal drum; and
    inserting mounting hardware through the aligned mounting apertures.

3. The method for installing punches according to claim 1, wherein the punch assembly is a side punch assembly.

4. The method for installing punches according to claim 3, wherein the internal drum includes a cylindrically shaped imaging surface, and wherein the carrier plate of the side punch assembly has an arcuate configuration to position the at least one punch about the cylindrically shaped imaging surface.

5. The method for installing punches according to claim 1, wherein at least one of the openings is slot shaped.

6. The method for installing punches according to claim 1, further including the steps of:
    providing a plurality of the punch assemblies, wherein each punch assembly includes a unique arrangement of punches installed thereon; and
    interchangeably installing the plurality of punch assemblies on the internal drum.

7. The method for installing punches according to claim 1, wherein the internal drum is located at a customer location, further including the steps of:
    submitting a specification for the punch assembly to a manufacturing location;
    aligning and installing the at least one punch on the carrier plate at the manufacturing location in accordance with the submitted specification, thereby forming a specified punch assembly; and
    shipping the specified punch assembly to the customer location for installation on the internal drum.

8. A method for installing at least one punch onto an imaging system, comprising the steps of:
    aligning and installing at least one punch onto a carrier plate, thereby forming the punch assembly; and
    immovably installing the punch assembly onto the imaging system to position the at least one punch in a fixed, predefined location.

9. The method according to claim 8, further including the steps of:
    positioning a plurality of locator pins on the imaging system;
    providing the carrier plate with a plurality of openings configured to receive the plurality of locator pins therein; and
    installing the punch assembly onto the imaging system by inserting the plurality of locator pins on the internal drum through the plurality of openings on the carrier plate.

10. The method according to claim 9, wherein at least one of the openings is slot shaped.

11. The method according to claim 8, further including the steps of:
    securing the punch assembly onto the imaging system.

12. The method according to claim 11, wherein the securing step further includes the steps of:

forming at least one mounting aperture on the imaging system;

forming at least one mounting aperture on the carrier plate, wherein the at least one mounting aperture on the carrier plate is aligned with the at least one mounting aperture on the imaging system when the punch assembly is installed on the imaging system; and inserting mounting hardware through the aligned mounting apertures.

13. The method according to claim 8, wherein the imaging system includes an internal drum having a cylindrically shaped imaging surface, and wherein the carrier plate of the punch assembly has an arcuate configuration to position the at least one punch about the cylindrically shaped imaging surface.

14. The method according to claim 8, further including the steps of:

providing a plurality of punch assemblies, wherein each punch assembly includes a unique arrangement of punches installed thereon; and interchangeably installing the plurality of punch assemblies onto the imaging system.

15. The method according to claim 8, wherein the imaging system is located at a customer location, further including the steps of:

submitting a specification for the punch assembly to a manufacturing location;

aligning and installing the at least one punch on the carrier plate at the manufacturing location in accordance with the submitted specification, thereby forming a specified punch assembly; and shipping the specified punch assembly to the customer location for installation on the imaging system.

16. The method according to claim 8, further including the steps of:

positioning a plurality of locator elements on the imaging system;

providing the carrier plate with a plurality of complementary locator elements; and installing the punch assembly onto the imaging system by coupling the plurality of locator elements on the imaging system to the plurality of complementary locator elements on the carrier plate.

17. A method for installing punches on an imaging system having an internal drum, comprising the steps of:

positioning a plurality of locator elements on the internal drum;

providing a carrier plate having a plurality of complementary locator elements;

aligning and installing at least one punch on the carrier plate, thereby forming a punch assembly; and installing the punch assembly onto the internal drum by coupling the plurality of locator elements on the internal drum to the plurality of complementary locator elements on the carrier plate.

* * * * *